US006155391A

United States Patent [19]

Kashiwagi et al.

[11] Patent Number: 6,155,391

[45] Date of Patent: Dec. 5, 2000

[54] HYDRAULIC SHOCK ABSORBER OF A DUMPING FORCE ADJUSTABLE TYPE

[75] Inventors: Akira Kashiwagi, Kanagawa-ken; Takashi Nezu, Tokyo, both of Japan

[73] Assignee: Tokico Ltd., Kanagawa-ken, Japan

[21] Appl. No.: 09/272,207

[22] Filed: Mar. 19, 1999

[30] Foreign Application Priority Data

Mar. 31, 1998 [JP] Japan .................................. 10-103549

[51] Int. Cl.[7] ..................................................... B60G 17/08

[52] U.S. Cl. .................................... 188/266.6; 188/322.13

[58] Field of Search .............................. 188/266.5, 266.6, 188/315, 322.13, 322.2

[56] References Cited

U.S. PATENT DOCUMENTS

| | | | |
|---|---|---|---|
| 5,398,787 | 3/1995 | Woessner et al. | 188/322.13 |
| 5,449,055 | 9/1995 | Geiling et al. | 188/266.6 |
| 5,934,421 | 8/1999 | Nakadate et al. | 188/322.13 |
| 5,960,915 | 10/1999 | Nezu et al. | 188/266.6 |

*Primary Examiner*—Christopher P. Schwartz
*Attorney, Agent, or Firm*—Wenderoth, Lind & Ponack, L.L.P.

[57] ABSTRACT

A hydraulic shock absorber of a damping force adjustable type generates a damping force by controlling the flow of an oily fluid caused to occur by the slidable movement of the piston in the cylinder by means of a subsidiary disc valve, a main disc valve and a disc valve mounted on the plunger. The damping force is controlled directly regardless of the piston speed by controlling the relief pressure of the disc valve in accordance with an electric current applied to a coil. The pressure in a back pressure chamber is varied with the relief pressure of the disc valve and the pressure for opening the main disc valve is controlled, thereby extending the scope of controlling the damping force. Further, an excessive rise in the damping force can be controlled due to a rapid input, and an impact can be absorbed by allowing the disc valve to bend and relieving oily fluid in the back pressure chamber.

9 Claims, 9 Drawing Sheets

SOFT

HYDRAULIC SHOCK ABSORBER OF A DUMPING FORCE ADJUSTABLE TYPE

BACKGROUND OF THE INVENTION

The entire disclosure of Japanese Patent Application No. 10-103549 filed on Mar. 31, 1998, including specification, claims, drawings and summary, is incorporated by reference in its entirety.

The present invention relates to a hydraulic shock absorber of a damping force adjustable type to be mounted on a suspension apparatus of a vehicle such as an automobile and the like.

Hydraulic shock absorbers to be mounted on a suspension apparatus of a vehicle such as an automobile and the like includes a hydraulic shock absorber of a damping force adjustable type, which is adapted so as to adjust the damping force to an appropriate extent in order to improve the riding comfort and stability of operation in accordance with the road situation, running status and the like.

A hydraulic shock absorber of a damping force adjustable type generally comprises a cylinder with an oily fluid filled therein, a piston connected to a piston rod and installed slidably in the cylinder so as to divide the inside of the cylinder into two compartments, and a main oily fluid passage and a bypass for communicating with the two compartments at a piston section. The main oily fluid passage is provided with a damping force generating mechanism comprising an orifice and a disc valve and the bypass is provided with a damping force adjusting valve for adjusting a passage area of the oil path.

The damping force adjusting valve is configured in such a fashion that, on the one hand, the damping force is reduced by decreasing the passage resistance to the passage of the oily fluid passing through the two compartments of the cylinder when the bypath is opened and, on the other hand, the damping force is increased by increasing the passage resistance between the two compartments thereof when the bypath is closed. The damping force characteristics can be adjusted appropriately by opening or closing the damping force adjusting valve in the manner as described above.

For the damping force adjusting valve of the type as adjusting the damping force by changing the passage area of the bypath, the damping force characteristics can be changed to a great extent in a low speed region of the piston speed because the damping force depends upon the restricted size of the oily fluid passage. However, the damping force characteristics cannot be greatly changed in a medium-high speed region of the piston speed because the damping force depends upon the opening degree of the damping force generating mechanism (e.g., disc valve, etc.) of the main oily fluid passage.

As disclosed, for example, in Japanese Patent Application Publication (Kokai) No. 62-220,728, a disc valve acting as the damping force generating mechanism of the main oily fluid passage common on the expanding and contracting sides is provided at the back portion thereof with a pressure chamber (a pilot chamber) so that for the pressure chamber to communicates with a cylinder chamber on the upstream side of the disc valve through a fixed orifice and to communicates with a cylinder chamber on the downstream side of the disc valve through a variable orifice, it is a flow rate control valve.

The hydraulic shock absorber of a damping force adjustable type is configured such that the passage area of the communicating passage between the two cylinder chambers in the cylinder can be controlled by opening or closing the variable orifice and the initial pressure for opening the disc valve can be changed by changing the pressure in the pressure chamber due to the loss of the pressure to be caused at the variable orifice. This configuration can adjust the orifice characteristics, in which the damping force is approximately proportional to a square of the piston speed, as well as the valve characteristics, in which the damping force is approximately proportional to the piston speed, thereby extending the scope of adjustment of the damping force characteristics.

Such conventional hydraulic shock absorber of a damping force adjustable type as disclosed in the prior patent publication is configured such that the damping force actually varies with the magnitude of the piston speed because the damping force is adjusted by controlling the flow rate with the variable orifice. Therefore, if a rapid input would be caused to occur due to the thrust of the road or for other reasons, the damping force is also caused to increase rapidly, together with a rise in the piston speed, thereby transmitting the impact to the vehicle body and as a consequence worsening the riding comfort. Moreover, as the variable orifice varies a passage resistance to a great extent due to the viscosity of an oily fluid, the damping force characteristics are adversely affected to a great extent by changes of temperature, thereby making it difficult to achieve stable damping force characteristics.

SUMMARY OF THE INVENTION

Therefore, the present invention has been completed with the above matters taken into account and has the object of providing a hydraulic shock absorber of a damping force adjustable type in which the scope of adjusting the damping force characteristics is extended, the damping force can be directly controlled regardless of the piston speed, the damping force characteristics are less affected by changes in temperature, and even a rapid input can be absorbed in an appropriate way.

In an embodiment of the present invention, the hydraulic shock absorber of a damping force adjustable type comprises a cylinder with an oily fluid filled therein. A piston is slidably installed in the cylinder, and a piston rod has one end thereof connected to the piston and the other end thereof extending outside of the cylinder. A main oily fluid passage and a subsidiary oily fluid passage are each connected to the cylinder and conduct an oily fluid with the sliding movement of the piston. A damping valve of a pilot type is disposed in the main oily fluid passage, a fixed orifice is disposed in the subsidiary oily fluid passage, and a pressure control valve is provided wherein the pressure between the fixed orifice in the subsidiary oily fluid passage and the pressure control valve acts as a pilot pressure for the damping valve of a pilot type. The pressure control valve comprises a solenoid control valve for adjusting the pressure for opening a disc valve by the thrust of a solenoid.

This configuration of the hydraulic shock absorber of a damping force adjustable type can adjust the pressure for opening the disc valve by the thrust of the solenoid, thereby enabling a direct adjustment of the damping force before opening the damping valve of a pilot type and simultaneously changing the pilot pressure by the control pressure with the pressure control valve, thereby adjusting the pressure for opening the damping valve of a pilot type. At this time, a rapid rise in the pressure of the oily fluid can be relieved by the bending of the disc valve.

In another embodiment of the present invention, the hydraulic shock absorber is characterized in that a regulation member for regulating the bending amount of the disc valve is disposed on the back surface side of the disc valve. This configuration allows the regulation member to prevent an excessive bending of the disc valve.

In a further embodiment of the present invention, the solenoid control valve is characterized in that a plunger for providing the thrust to the disc valve is biased with a disc-shaped plate spring. This configuration of the solenoid control valve can adjust the pressure for opening the disc valve by applying the thrust to the plunger in resistance to the spring force of the plate spring by the solenoid.

In a still further embodiment of the present invention, the hydraulic shock absorber is characterized in that the pressure control valve is provided with a flow rate control valve for adjusting a passage area of the subsidiary oily fluid passage in accordance with the thrust of the solenoid.

This configuration of the solenoid control valve can adjust the orifice characteristics as well as the valve characteristics in accordance with the thrust of the solenoid before opening the damping valve of the pilot type.

In another embodiment of the present invention, the hydraulic shock absorber of a damping force adjustable type adapted so as to adjust a damping force comprises a cylinder with an oily fluid filled therein, a piston disposed slidably in the cylinder so as to form a cylinder chamber therein, a piston rod with one end thereof extending outside the cylinder from the piston, a reservoir disposed in the cylinder for accommodating an operating fluid, and a first fluid path locating the cylinder to fluidly communicate with the reservoir. A damping valve of a pilot type is disposed in the first fluid path for generating a damping force. A second fluid path by-passes the damping valve of a pilot type and provides a pilot pressure to the damping valve of a pilot type. A pressure control valve disposed in the second fluid path controls the pilot pressure of the damping valve of a pilot type by adjusting a pressure for opening a valve body in accordance with the thrust of a solenoid.

This configuration of the solenoid control valve can relieve a rapid rise of the pressure of the oily fluid by controlling the pilot pressure of the damping valve of the pilot type by using the pressure control valve when a rapid input due to the thrust from a road occurs.

In another embodiment of the present invention, the pressure control valve has a regulation member for regulating an opening amount of a valve body in the pressure control valve on the back surface side of the valve body, whereby excessive opening of the pressure control valve, as well as a damage of the control valve due to the excessive opening, are prevented.

In another embodiment of the present invention, the pressure control valve has a plunger for providing the thrust to the valve body biased with a disc-shaped plate spring, whereby an opening amount of the valve body can be adjusted by applying the thrust of the solenoid to the plunger against the spring force of the disc-shaped plate spring. Accordingly, the use of a coil spring for biasing the plunger is not required and the pressure control valve can be made compact and smaller in size.

In a further embodiment of the present invention, the pressure control valve has a flow rate control valve for adjusting a flow rate of the fluid passing through the second fluid path. Accordingly, both the adjustment of a relief pressure of the pressure control valve and the adjustment of a flow rate of the fluid passing through the pressure control valve can be effected, whereby the freedom of adjusting the damping force can be extended.

In a still further embodiment of the present invention, the flow rate control valve can control a passage area of the second fluid path in accordance with the thrust of a solenoid, whereby the orifice characteristics, as well as the valve characteristics, can be adjusted in accordance with the thrust of a solenoid before opening the damping valve of a pilot type.

BRIEF DESCRIPTION OF THE DRAWINGS

The above-mentioned objects, features and advantages of the present invention will become apparent during the course of the description of the embodiments of the present invention with reference to the accompanying drawings, in which.

DETAILED DESCRIPTION OF THE INVENTION

Figure 1:
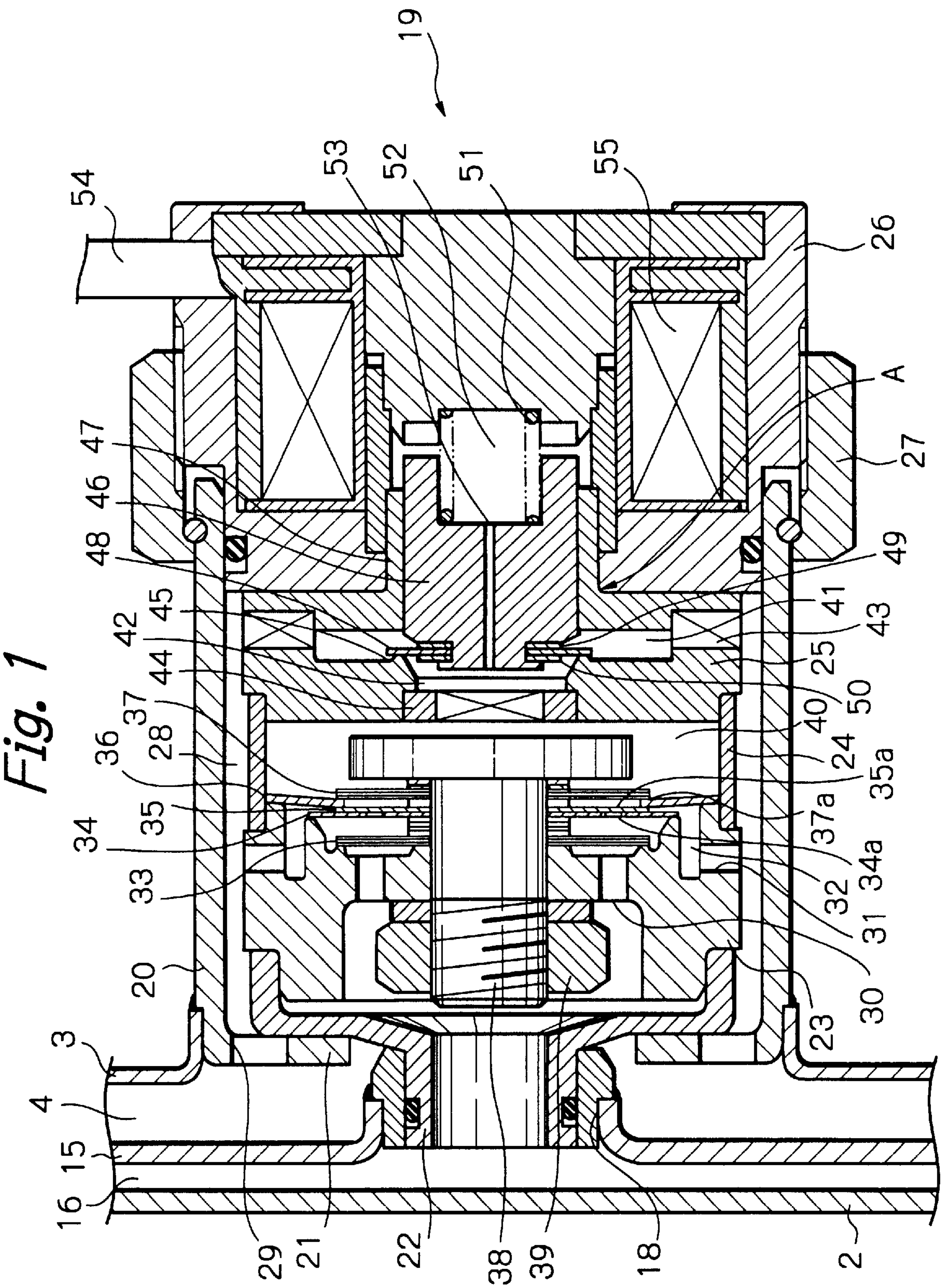
FIG. 1 is a longitudinal view in section showing a damping force generating mechanism of a hydraulic shock absorber of a damping force adjustable type in accordance with a first embodiment of the present invention.

The present invention will be described in more detail by way of specific embodiments with reference to the accompanying drawings.

A description will be made of the hydraulic shock absorber according to the first embodiment of the present invention with reference to FIGS. 1 to 3 and 12. As specifically shown in FIG. 2, a hydraulic shock absorber 1 of a damping force adjustable type in this specific embodiment is of a double-cylinder structure in which a cylinder 2 is disposed inside an outer cylinder 3 and a reservoir 4 is interposed between the cylinder 2 and the outer cylinder 3. In the cylinder 2 is slidably disposed a piston 5 so as to divide the cylinder 2 into two cylinder compartments, i.e. an upper cylinder compartment 2*a* and a lower cylinder compartment 2*b*. To the piston 5 is connected at one end thereof a piston rod 6 with a nut 7 and the other end of the piston rod 6 is disposed so as to extend inside the upper cylinder compartment 2*a* and then through a rod guide 8, disposed at the upper end portion of the cylinder 2 and the outer cylinder 3, and an oil seal 9, extending outside the cylinder 2. The lower end portion of the cylinder 2 is provided with a base valve 10 defining the lower cylinder compartment 2*b* and the reservoir 4.

The piston 5 is provided with an oil path 11 communicating the upper cylinder compartment 2*a* with the lower cylinder compartment 2*b* and with a check valve 12 that allows only the passage of the oily fluid from the side of the lower cylinder compartment 2*b* of the oil path 11 to the side of the upper cylinder compartment 2*a* thereof. The base valve 10 is provided with an oil path 13 communicating the lower cylinder compartment 2*b* with the reservoir 4 and with a check valve 14 that allows only the passage of the oily fluid from the side of the reservoir 4 of the path 13 to the side of the lower cylinder compartment 2*b*. The cylinder 2 is filled with the oily fluid and the reservoir 4 is filled with the oily fluid and gases of a predetermined pressure.

An outer tube 15 is provided on the outside of the cylinder 2 so as to form a ring-shaped oil path 16 between the outer surface of the cylinder 2 and the outer tube 15. The ring-shaped oil path 16 is disposed communicating with the upper cylinder compartment 2*a* via an oil path 17 disposed at a side wall near the upper end portion of the cylinder 2. The outer tube 15 is provided with an opening 18 at its side wall and a damping force generating mechanism 19 is mounted on the side surface portion of the outer cylinder 3.

A description will now be made of the damping force generating mechanism 19 with reference to FIG. 1. An opening portion on a one end side of a cylindrical case 20 with a flange portion 21 is welded on the side wall of the outer cylinder 3 as shown in FIG. 1. In the case 20 are disposed a passage member 22, a valve member 23, a cylindrical member 24 and a pilot valve member 25 in this order from the side of the flange portion 21 so as to allow each member to abut with the adjacent member. A proportional solenoid control section 26 is mounted on the other end side of the case 20 and abuts with the pilot valve member 25 to fix the passage member 22, the valve member 23, the cylindrical member 24 and the pilot valve member 25. Between an outer peripheral portion of each of the passage member 22, the valve member 23, the cylindrical member 24 and the pilot valve member 25 and the case 20 is provided an annular oil chamber 28 which in turn communicates with the reservoir 4 through an oil path 29 disposed in the flange portion 21 of the case 20.

The valve member 23 is provided with oil paths 30 and 31 and an annular groove 32, which communicate the passage member 22 with the annular oil chamber 28. On the valve member 23 are mounted a subsidiary disc valve 33, a main disc valve 34 (a pilot-type damping valve), a spacer disk 35, a seal ring 36 and a disc-shaped plate spring 37 by means of a pin 38 and a nut 39. The subsidiary disc valve 33 and the main disc valve 34 are configured so as to generate a damping force by controlling the passage of the oily fluid from the oil path 30 to the oil path 32 in accordance with the degree of the opening by lifting the outer peripheral portions thereof. The spacer disk 35 and the seal ring 36 are allowed to press the back surface portion of the main disc valve 34 through the disc-shaped plate spring 37 to form a back pressure chamber 40 in association with the pilot valve member 25 so as to allow the inner pressure of the back pressure chamber 40 to act upon the main disc valve 34 in the direction of closing the valve.

The main disc valve 34 is provided with a fixed orifice 34*a* which in turn communicates with the back pressure chamber 40 through an oil path 35*a* of the spacer disk 35 and a cut-away portion 37*a* formed at the outer peripheral portion of the disc-shaped plate spring 37.

The pilot valve member 25 is provided with an oil path 42 which allows the back pressure chamber 40 to communicate with an oil chamber 41 formed in association with the proportional solenoid control section 26. The oil chamber 41 communicates with the annular oil chamber 28 via an oil path 43. The oil path 42 is provided with a filter 44. The pilot valve member 25 has an annular valve seat 45 projecting around the periphery of the oil path 42 and a plunger 46 of the proportional solenoid control section 26 is guided with a guide 47 so as to move forwards and backwards. On the top end portion of the plunger 46 is mounted a disc valve 48 to be seated on the annular valve seat 45. The disc valve 48 clamps on the top end portion of the plunger 46 and is fixed to the plunger 46 via spacers 49 and 50.

The plunger 46 is biased with a coil spring 51 toward the annular valve seat 45 and the disc valve 48 is pressed onto the annular valve seat 45 by means of a predetermined initial load created by the spring force of the spring 51. The plunger 46 is provided with a throttling passage 53 which allows an oil path 52 formed at the rear portion thereof to communicate with the oil path 42 so as to balance the pressure acting upon both the end portions of the plunger 46 with each other and have an appropriate amount of the damping force upon the movement of the plunger 46. In this configuration, the annular valve seat 45, the plunger 46 and the disc valve 48 constitute a pressure control valve A. The pressure control valve A is configured such that, when electric current is applied to a coil 55 (a solenoid) through a lead wire 54, a thrust acts on the plunger 46 in the direction in which the disc valve 48 separates from the valve seat 45, and such that and the pressure for opening the disc valve 48 is determined by means of the balance of the thrust with the initial load of the spring 51. The opening pressure can adjust the control pressure (the relief pressure) of the pressure control valve A in accordance with the electric current applied to the coil 55.

In the above configuration, the oil path 17, the annular oil path 16, the opening 18, the passage member 22, the oil path 30, the ring-shaped groove 32, the oil path 31, the ring-shaped oil chamber 28 and the oil path 29 constitute a main oily fluid passage that allows the upper cylinder compartment 2$a$ to communicate with the reservoir 4. On the other hand, the fixed orifice 34$a$, the oil path 35$a$, the cut-away portion 37$a$, the back pressure chamber 40, the oil path 42, the oil path 41 and the oil path 43 constitutes a subsidiary oily fluid passage bypassing the main disc valve 34 acting as a pilot-type damping valve.

Then, a description will be made of the action of the hydraulic shock absorber according to the embodiment having the configuration as described above.

At the time of the expanding stroke of the piston rod 6, the check valve 12 of the oil path 11 of the piston 5 is closed by the movement of the piston 5 to apply pressure to the oily fluid in the upper cylinder compartment 2$a$. Upon application of the oily fluid to the upper cylinder compartment 2$a$, the oily fluid is then allowed to flow through the oil path 17, the annular oil path 16 and the opening 18 to the passage member 22 of the damping force generating mechanism 19. Then, the oily fluid is further allowed to flow through the oil path 30, the subsidiary disc valve 33, the fixed orifice 34$a$ of the main disc valve 34, the oil path 35$a$ of the spacer disk 35 and the cut-away portion 37$a$ of the disc-shaped plate spring 37 to the back pressure chamber 40. As the pressure of the oily fluid reaches the cracking pressure of the pressure control valve A, the oily fluid of the back pressure chamber 40 then causes the plunger 46 to move backwards and the disc valve 48 to lift from the valve seat 45, thereby flowing through the oil path 41, the oil path 43, the ring-shaped oil chamber 28 and the oil path 29 to the reservoir 4.

At this time, the oily fluid passing through the subsidiary disc valve 33 allows the main disc valve 34 to open, as the pressure reaches the pressure for opening the main disc valve 34, and flows toward the annular groove 32 and through the oil path 31 directly into the annular oil chamber 28. Oily fluid in the amount in which the piston 5 has moved opens the check valve 14 of the oil path 13 of the base valve 10 and flows into the lower cylinder compartment 2$b$ from the reservoir 4.

On the other hand, at the time of the contracting stroke of the piston rod 6, the check valve 12 of the oil path 11 of the piston 5 is opened by the movement of the piston 5 while the check valve 14 of the oil path 13 of the base valve 10 is closed, thereby causing the oily fluid of the lower cylinder compartment 2$b$ to flow into the upper cylinder compartment 2$a$ and allowing the oily fluid in an amount corresponding to the movement of the piston rod 6 in the piston 5 to flow into the reservoir 4 from the upper cylinder compartment 2$a$ in substantially the same manner as at the time of the expanding stroke of the piston rod 6 as described above.

Therefore, at the time of both expanding and contracting strokes of the piston rod 6, the damping force is generated with the subsidiary disc valve 33, the fixed orifice 34$a$, and the pressure control valve A before the main disc valve 34 is opened, i.e. in a low speed region of the piston speed, and the pressure of the back pressure chamber 40, i.e. the damping force, can be directly controlled regardless of the piston speed by controlling the control pressure (relief pressure) of the pressure control valve A in accordance with the electric current applied to the coil 55 of the proportional solenoid valve 26. At this time, the pressure for opening the main disc valve 34 is adjusted together with the control pressure of the pressure control valve A as the inner pressure of the back pressure chamber 40 acts in the direction of closing the main disc valve 34. Consequently, the damping force (the damping force in a high speed region of the piston speed) due to the valve-opening characteristics of the main disc valve 34 can be controlled.

Figure 12:
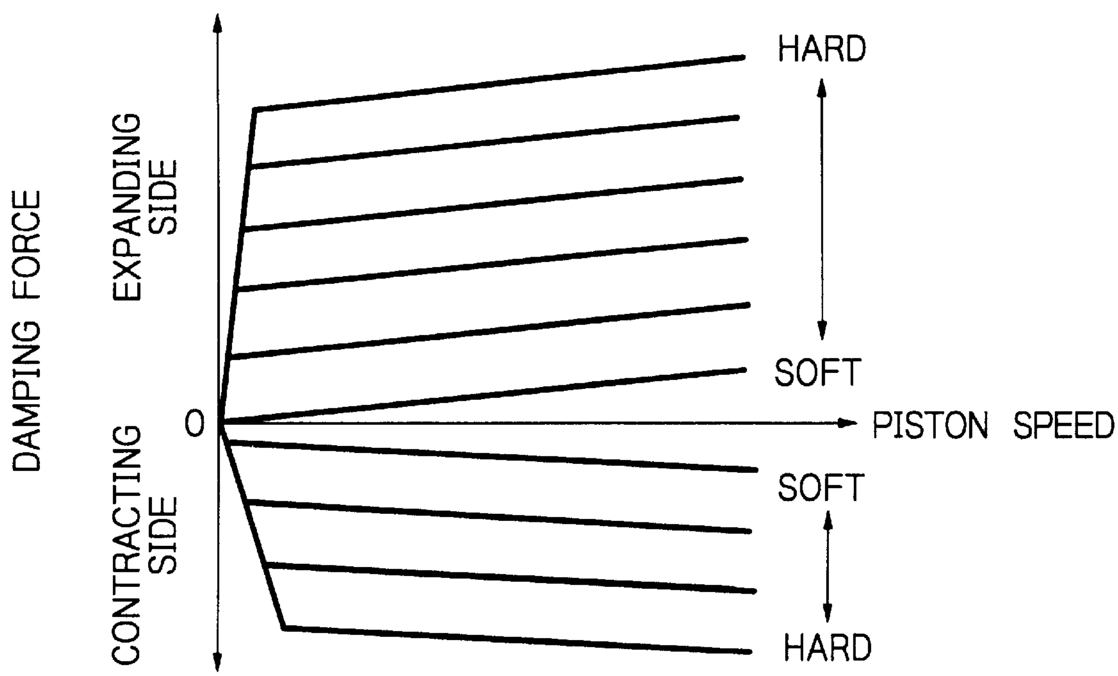
FIG. 12 is a graph showing the damping force characteristics of the hydraulic shock absorber of a damping force adjustable type in accordance with the first embodiment of the present invention.

In the manner as described above, the damping force can be adjusted over a wide region ranging from the low speed region of the piston speed to the high speed region thereof so that the area of adjustment can be extended. Further, as the pressure control valve A can provide an appropriate amount of damping force in the low speed region of piston speed, too, by the valve characteristics, a lack of damping force in the low speed region of piston speed and an excess rise of the damping force in the high speed region thereof can be prevented. The damping force characteristics of the hydraulic shock absorber 1 of a damping force adjustable type are indicated in FIG. 12. The pressure control valve A can provide the damping force in a more stable manner in accordance with a variation in temperature because it has a smaller impact upon resistance to passage by changes of the viscosity of the oily fluid than a variable orifice (a flow amount control valve).

Moreover, if the pressure of the back pressure chamber 40 rose rapidly due to a rapid input by the thrust from the road or for other reasons, the disc valve 48 of the pressure control valve A is caused to bend lifting the outer peripheral portion thereof from the valve seat 45 and consequently relieving the pressure of the back pressure chamber 40 quickly into the oil path 41. Therefore, a rapid rise of the damping force can be controlled to improve the riding comfort of the vehicle. The disc valve 48 is larger in opening area with respect to the lift amount as compared with a conventional poppet valve so that the amount of movement of the plunger 46 can be made smaller. This provides better responsiveness and is unlikely to undergo influences from abrasion resistance.

Figure 3:
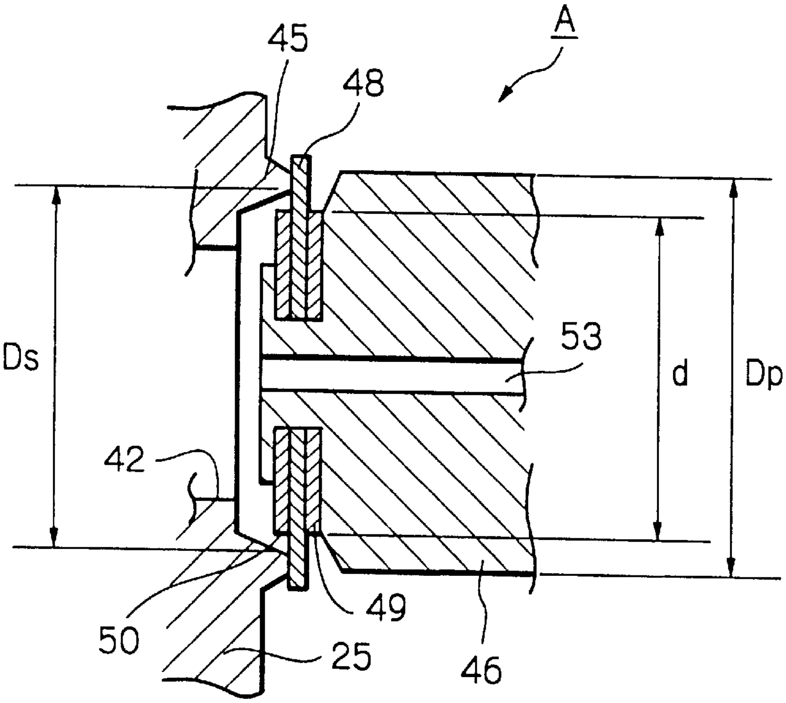
FIG. 3 is an enlarged view showing a pressure control valve of the damping force generating mechanism of the hydraulic shock absorber of FIG. 1.

A description will be made of an example of the actual dimensions of the essential portion of the pressure control valve A with reference to FIG. 3.

A static pressure recipient area Sp of the disc valve 48 can be determined by the following formula (1):

$$Sp=Fs/Pn \tag{1}$$

where

Fs is the abutment load to the valve seat 45 of the disc valve 48; and

Pn is the pilot pressure upon obtaining the hard damping force, i.e. the pressure of the back pressure chamber 40.

Further, the pressure recipient area Sp can be determined by the following formula (2):

$$Sp=(Ds^2-Dp^2)\pi/4 \tag{2}$$

where

Ds is the diameter of the valve seat 45; and d is the diameter of a clamp portion of the disc valve 48 (the diameter of the spacer 49).

At the time of the soft damping force, it is desired that the loss of pressure by the pressure control valve A is sufficiently small. This can be achieved when the following formula (3) can be established:

$$\pi(Ds)h \geqq m\pi d_o^2/4 \tag{3}$$

where $d_o$ is the diameter of the fixed orifice 34$a$ on the upstream side of the pressure control valve A;

m is the multiplication of the passage area of the pressure control valve A by the passage area of the fixed orifice 34$a$; and h is the lift amount of the disc valve 48 yielding a sufficient flow passage area (the sum of the bending amount of the disc valve 48 and the amount of the forward or backward displacement of the plunger 46).

The above formula (3) can determine the lift amount h when the pilot pressure Ps (the pressure of the back pressure chamber 40) is acting upon obtaining the soft damping force. From this, a spring constant $k_d$ with respect to the thickness t of the disc valve 48 and the bending thereof can be determined.

When a spring constant of the spring 51 biasing the plunger 46 is set as $k_p$, the thrust of the plunger 46 by the coil 55 as Fp, and the stroke of the plunger 46 as S, the relationship of the abutment load Fs with the spring constant $k_p$, the thrust Fp and the stroke S can be represented by the following formulas (4) and (5):

$$S=Fp/(k_d+k_p) \quad (4),$$

and $$Fs=k_d \times S \quad (5).$$

Supposing herein that the parameters for the hydraulic shock absorber according to the first embodiment are set as follows, e.g., Pn=2.43 MPa;

Fs=18.8 N;

d=8.0 mm;

m=2;

$d_o$=1.0 mm;

Ps=0.15 MPa; and

Dp=12.0 mm (the diameter of the plunger 46), then static pressure recipient area Sp of the disc valve 48 can be obtained from the formula (1) as follows:

$$Sp=7.74\times10^{-6}\ (m^2);$$

the diameter Ds of the valve seat 45 can be obtained from the formula (2) as follows:

*Ds*=12.4 (mm); and the lift amount h of the disc valve 48 can be obtained from the formula (3) as follows:

$$h=d_o^2/2Ds=0.04\ (mm).$$

When there are further set the plate thickness of the disc valve 48 as t=0.15 mm, the spring constant of the disc valve 48 as $k_d$=627.4 (N/mm), the spring constant of the spring 51 as $k_p$=8.0 (N/mm), and the thrust of the plunger 46 by the coil 55 as Fp=19.6 (N), the stroke S of the plunger 46 can be obtained from the formula (4) as follows:

$$S=19.6/(627.4+8.0)=0.03\ (mm).$$

Given this, when the pilot pressure Ps upon obtaining the soft damping force is set as Ps=0.15 MPa, the lift amount h of the disc valve 48 can be obtained as $$h=0.16\ (mm),$$

and this amount can satisfy the formula (3).

Figure 4:
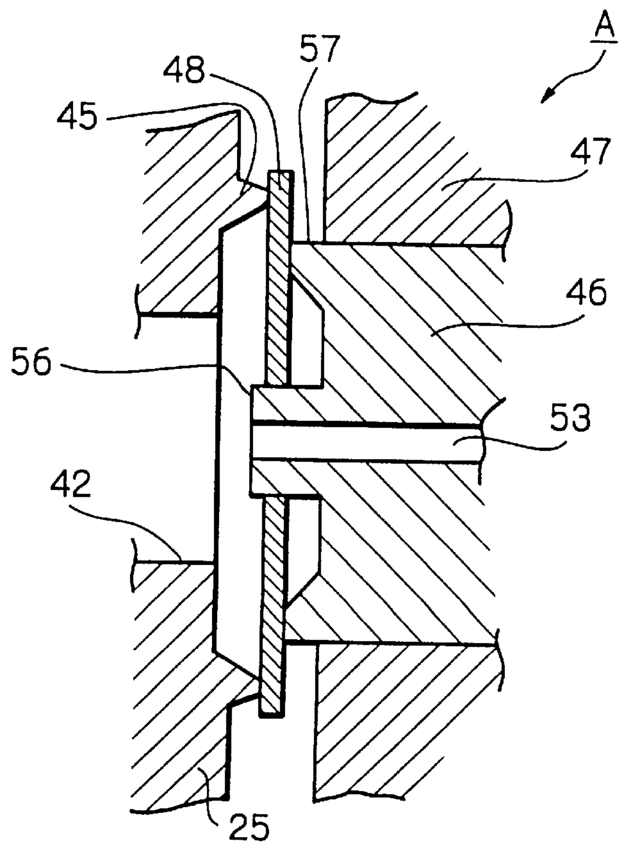
FIG. 4 is an enlarged view showing a pressure control valve in accordance with a first modification of the first embodiment of the present invention.
Figure 5:
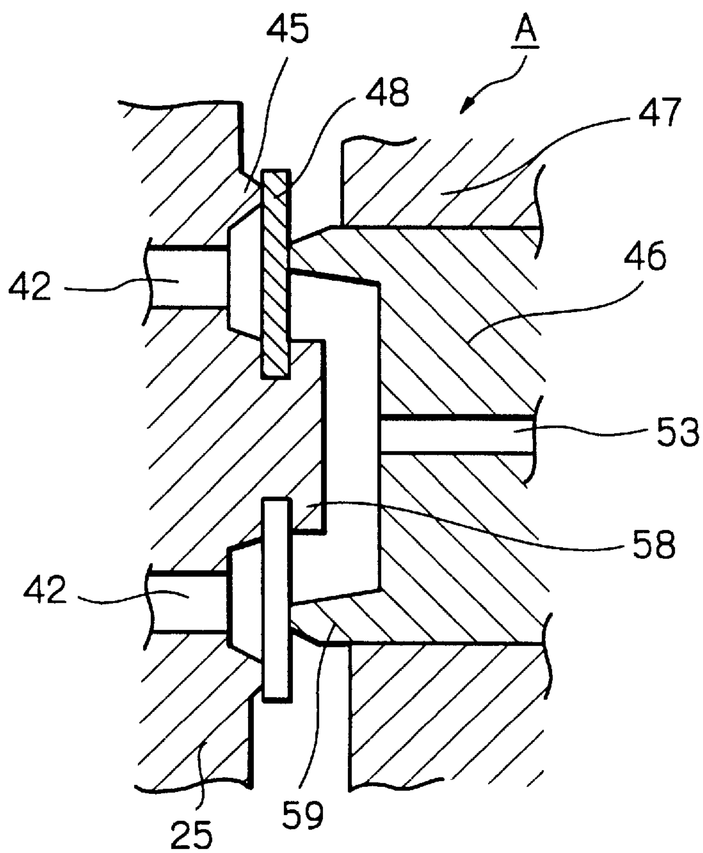
FIG. 5 is an enlarged view showing a pressure control valve in accordance with a second modification of the first embodiment of the present invention.

Next, a description will be made of first and second modifications of the disc valve of the pressure control valve A according to the first embodiment of the present invention with reference to FIGS. 4 and 5. In FIGS. 4 and 5, the identical elements are provided with reference numerals identical to those indicated in FIGS. 1 to 3 in order to omit duplication of the description.

In the first modification as shown in FIG. 4, the disc valve 48 is not fixed to the plunger 46, but disposed such that a convex portion 56 formed at the top end portion of the plunger 46 is inserted into the disc valve 48. Further an outer peripheral edge portion 57 is projected at the tip of the plunger 46 so as to allow the outer peripheral edge portion 57 to abut with the back surface portion of the disc valve 48. This configuration can offer substantially the same action and effects as those achieved by the hydraulic shock absorber according to the first embodiment of the present invention.

On the other hand, in the second modification as shown in FIG. 5, the disc valve 48 is fixed to a convex portion 58 formed at the central portion of the valve seat 45 on the side of the pilot valve member 25 and disposed such that an outer peripheral edge portion 59 at the tip of the plunger 46 is configured so as to project, thereby allowing the outer peripheral edge portion 59 to abut with the back surface portion of the disc valve 48. This configuration can likewise achieve substantially the same action and effects as those achieved by the hydraulic shock absorber according to the first embodiment of the present invention.

Figure 2:
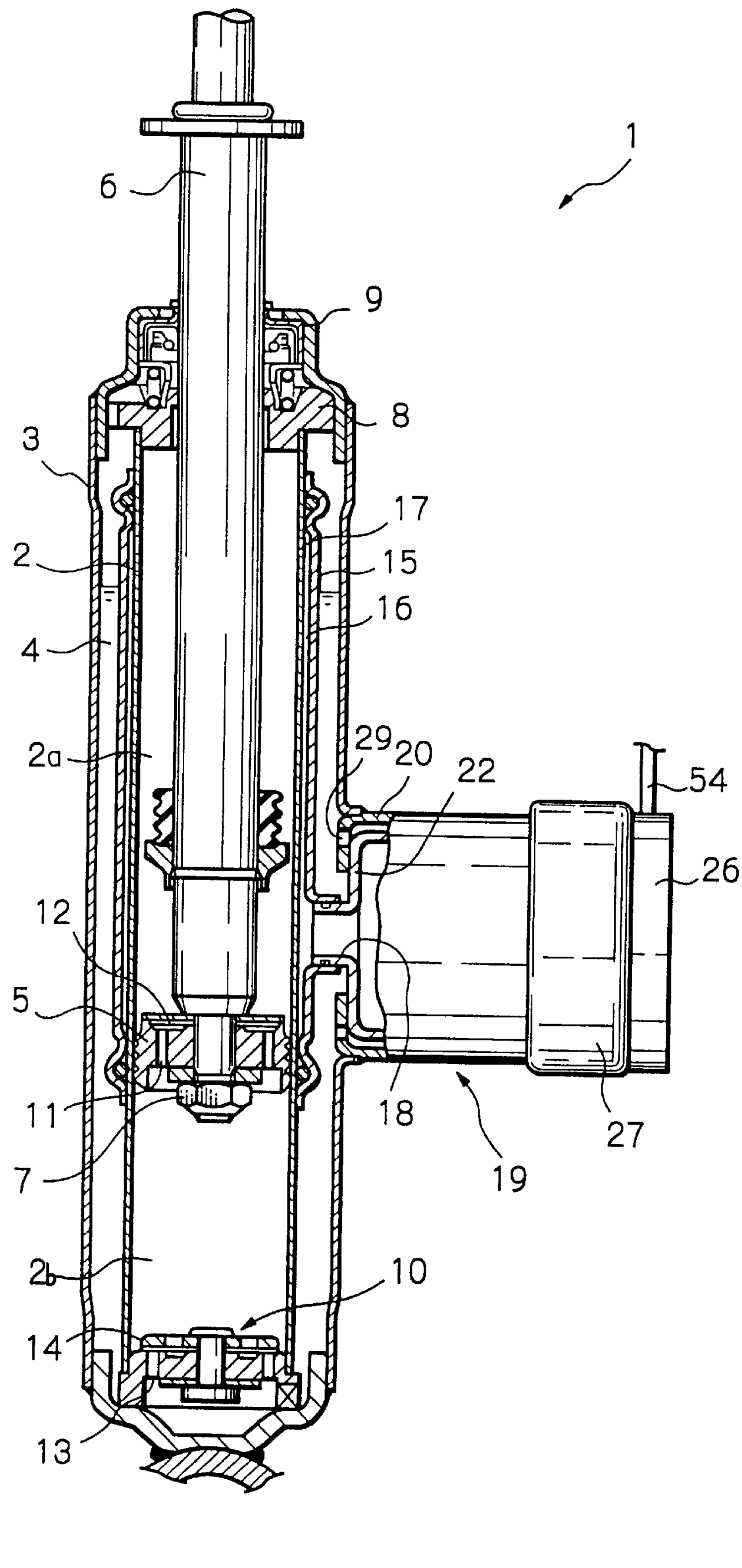
FIG. 2 is a longitudinal view in section showing the hydraulic shock absorber of a damping force adjustable type in accordance with the first embodiment of the present invention.

A description will be made of the hydraulic shock absorber according to a second embodiment of the present invention with reference to FIG. 6. It is to be noted herein that the configuration of the hydraulic shock absorber according to the second embodiment is substantially similar to that of the first embodiment except for the structure of a disc valve section of the pressure control valve. Therefore, FIG. 6 shows the section around the disc valve of pressure control valve while the identical elements FIGS. 1 to 3 are provided with identical reference numerals, and a detailed description will be made of the elements different from those as shown in FIGS. 1 to 3.

Figure 6:
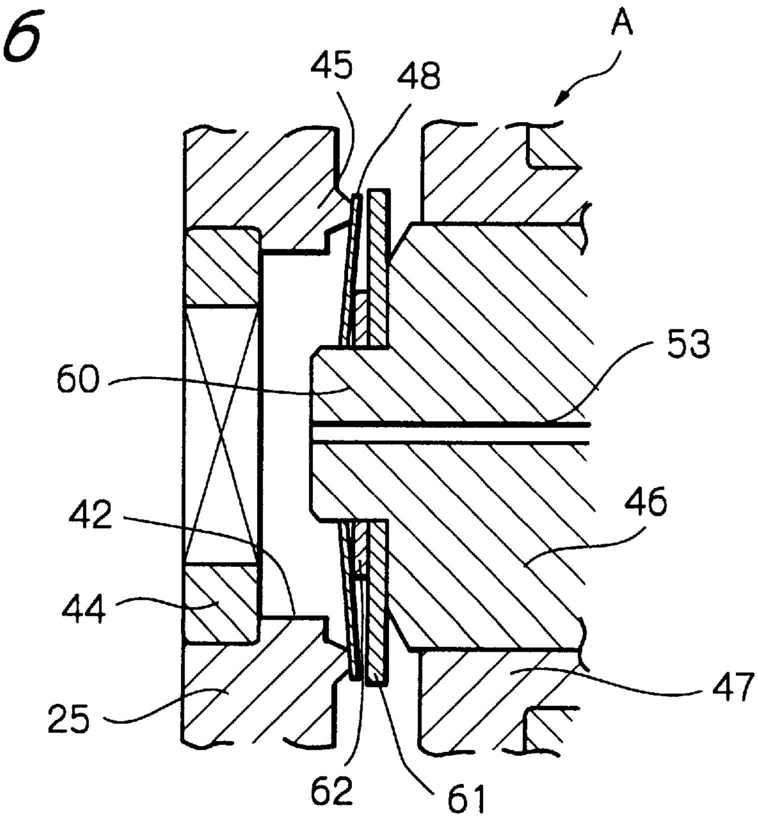
FIG. 6 is an enlarged view showing a pressure control valve of a damping force generating mechanism of a hydraulic shock absorber of a damping force adjustable type in accordance with a second embodiment of the present invention.

For the hydraulic shock absorber according to the second embodiment as shown in FIG. 6, a washer 61 (acting as a regulation member), a small-sized spacer 62 and the disc valve 48 are engaged with a convex portion 60 formed at the tip portion of the plunger 46. The washer 61 is configured so as to be slightly larger in size than the disc valve 48 and to have a sufficient degree of rigidity and disposed apart via the spacer 62 in a spaced relationship by a predetermined distance on the back surface side of the disc valve 48 so as to regulate the lift amount, i.e. the amount of bending, of the disc valve 48. It is to be noted, however, that the size of the washer 61 may be set so as to be equal to or slightly smaller than the disc valve 48. In other words, the size of the washer 61 may be set to a size as long as the outer peripheral edge portion of the disc valve 48 can abut with the washer 61 and regulate the lift amount of the disc valve 48 upon lifting the disc valve 48.

With the configuration as described above, the washer 61 can regulate the maximum bending amount of the disc valve 48, thereby preventing an excessive amount of bending and damage to the disc valve 48 with certainty. Even if the disc valve 48 were to be broken, the washer 61 can abut with the valve seat 45, thereby preventing the filter 44 from being broken by the projection of the plunger 46.

Figure 13:
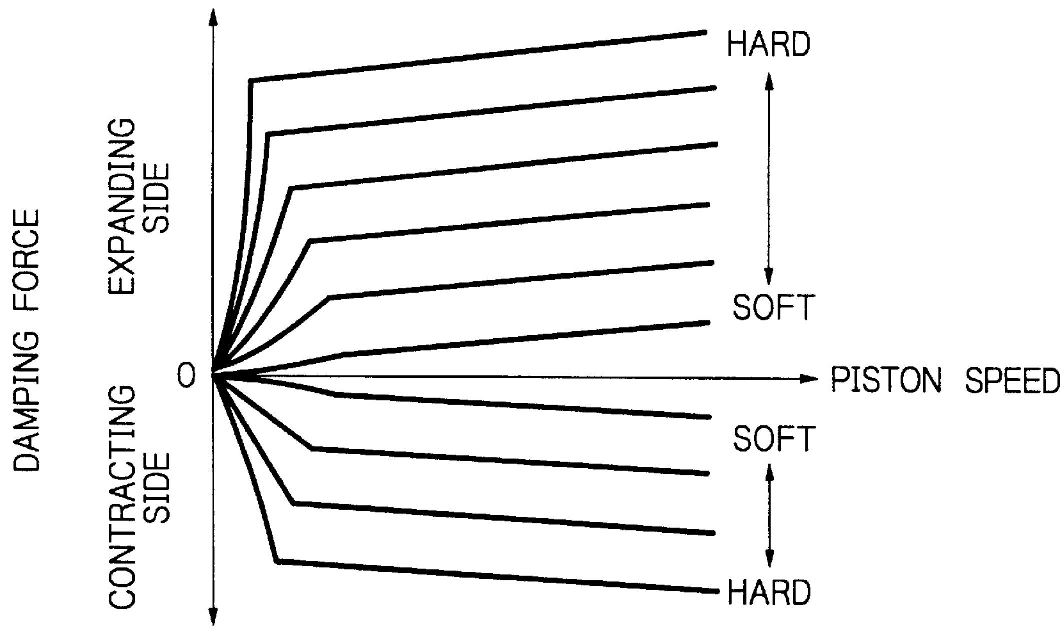
FIG. 13 is a graph showing the damping force characteristics of the hydraulic shock absorber of a damping force adjustable type in accordance with the third embodiment of the present invention.

A description will be made of a hydraulic shock absorber according to third embodiment of the present invention with reference to FIGS. 7, 11 and 13. It is to be noted herein that the configuration of the hydraulic shock absorber according to the third embodiment is substantially similar to that of the first embodiment except for the structure of the pressure control valve. Therefore, identical elements of the hydraulic shock absorber in the third embodiment are provided with the identical reference numerals as that of the first embodiment as shown in FIGS. 1 to 3, and detailed description will be made of the elements different from those as shown in FIGS. 1 to 3.

Figure 7:
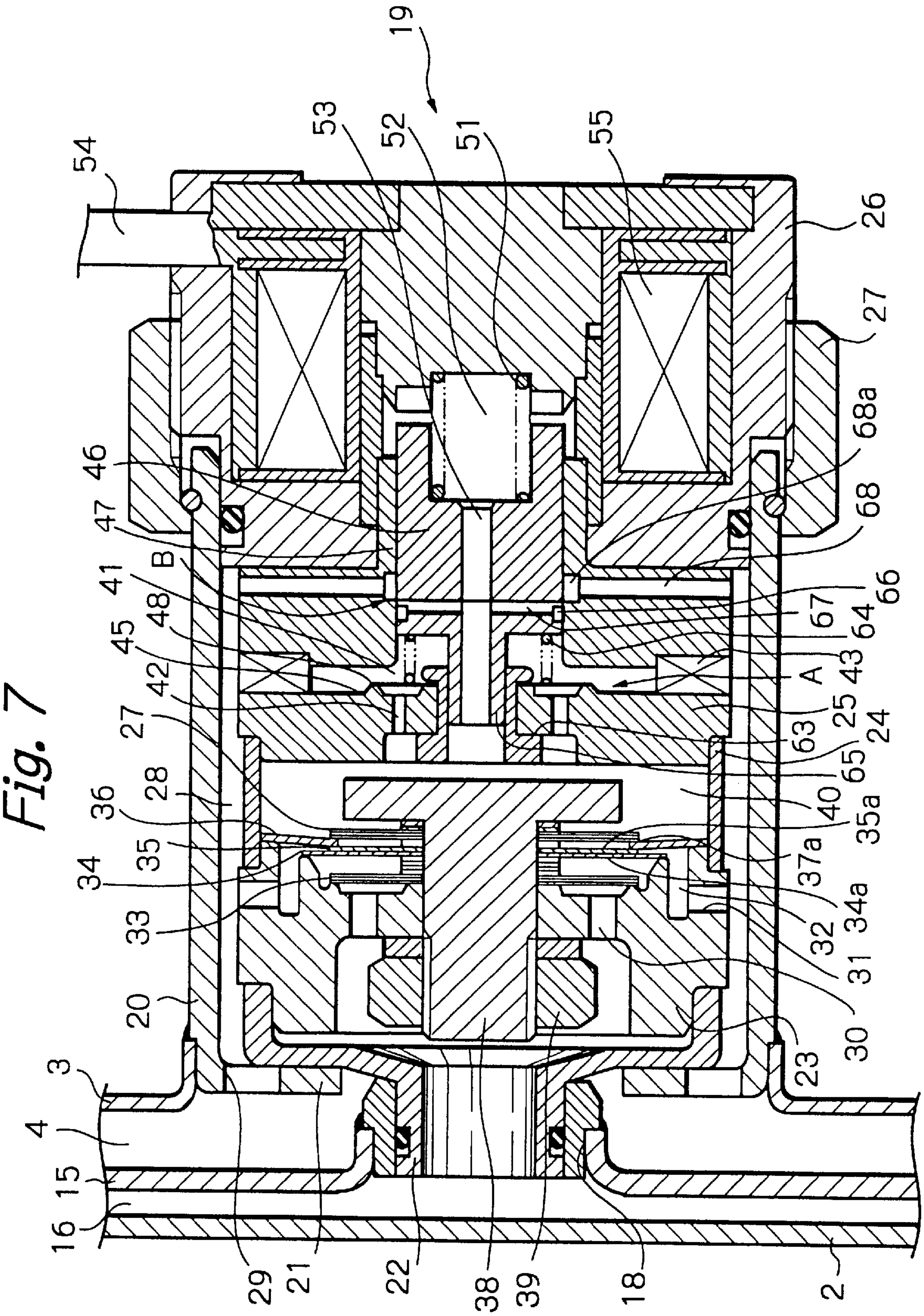
FIG. 7 is a longitudinal view in section showing a damping force generating mechanism of a hydraulic shock absorber of a damping force adjustable type in accordance with a third embodiment of the present invention.

In the hydraulic shock absorber according to the third embodiment as shown in FIG. 7, the disc valve 48 is mounted on the pilot valve member 25 through a guide member 63 and a coil spring 64 is interposed between the disc valve 48 and the plunger 46. The plunger 46 has its tip portion 65 projecting into and guided slidably within the guide member 63.

The plunger 46 has an outer peripheral groove 66 disposed on the side surface portion thereof and the outer peripheral groove 66 is further disposed so as to communicate with the back pressure chamber 40 through an oil path 67 via the throttling passage 53. The guide 47 is provided with an annular groove 68*a* communicating with the annular chamber 28 and a port 68, which face the outer peripheral groove 66 formed on the plunger 46. The outer peripheral groove 66 of the plunger 46 and the annular groove 68*a* of the guide 47 constitute a flow rate control valve B.

The plunger 46 is usually moved toward the valve seat 45 by compressing the spring 64 by the spring force of the spring 51. In this state, the disc valve 48 is pressed onto the valve seat 45 by means of the maximum spring force of the spring 64 to minimize the passage area of the flow rate control valve B, i.e. the communicating passage area between the outer peripheral groove 66 and the annular groove 68*a*. Then, the activation of the coil 55 causes the plunger 46 to move in the backward direction in resistance to the spring force of the spring 51, thereby reducing the set load, i.e. the relief pressure, of the disc valve 48 with the spring 64 and simultaneously enlarging the passage area of the flow rate control valve B.

Now, a description will be made of the hydraulic circuit of the hydraulic shock absorber of a damping force adjustable type in accordance with the third embodiment of the present invention with reference to FIG. 11. In the configuration as shown in FIG. 11, identical elements are provided with identical reference numerals as those indicated in FIGS. 1, 2 and 7 in order to omit the duplicate description of the identical elements.

Figure 11:
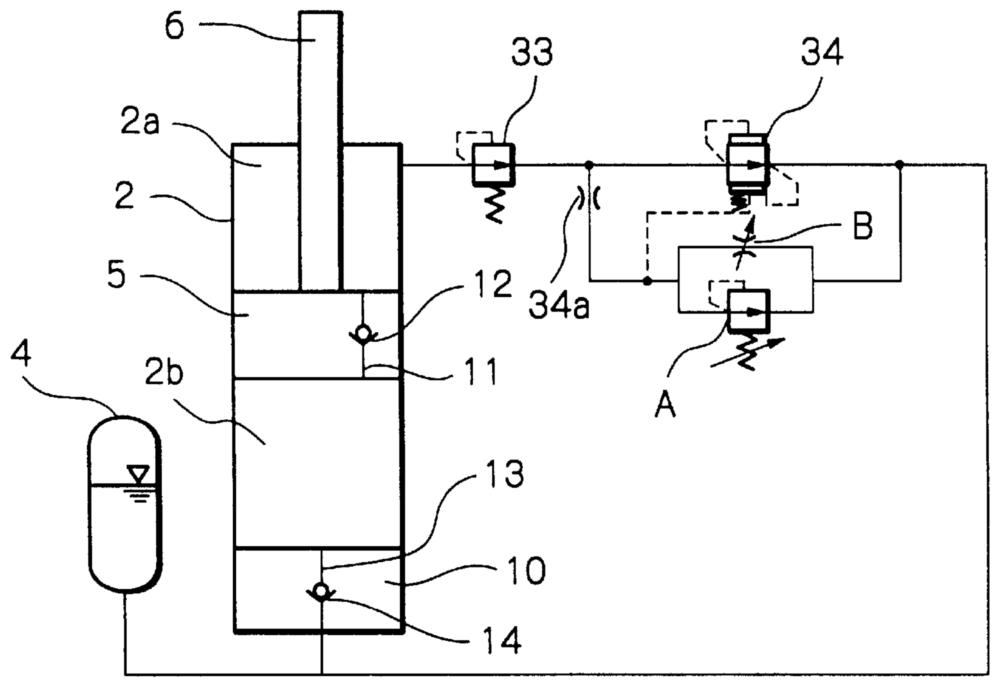
FIG. 11 is a diagram showing an oil pressure circuit of the hydraulic shock absorber of a damping force adjustable type in accordance with the third embodiment of the present invention.

With the configuration as shown in FIG. 11, the passage area of the flow rate control valve B as well as the control pressure of the pressure control valve A can be controlled in accordance with the electric current fed to the coil 55. Therefore, as the orifice characteristics by the flow rate control valve B can be adjusted in the low speed region of the piston speed before opening the main disc valve 34, together with the valve characteristics by the pressure control valve A, the freedom for setting the damping force characteristics can be extended with respect to the damping force characteristics of the hydraulic shock absorber according to the first embodiment of the present invention. FIG. 13 shows the damping force characteristics of the hydraulic shock absorber of a damping force adjustable type according to the third embodiment of the present invention.

Further, a description will be made of the hydraulic shock absorber according to a fourth embodiment of the present invention with reference to FIGS. 8 and 9. As the configuration of the hydraulic shock absorber according to the fourth embodiment is substantially similar to that of the second embodiment except for the structure of a spring biasing the plunger of the pressure control valve, FIGS. 8 and 9 indicate each a damping force generating mechanism alone. Moreover, in FIGS. 8 and 9, identical elements are provided with identical reference numerals as those as indicated in FIGS. 1, 2 and 6, and detailed description will be made of the elements different from those as indicated therein.

Figure 8:
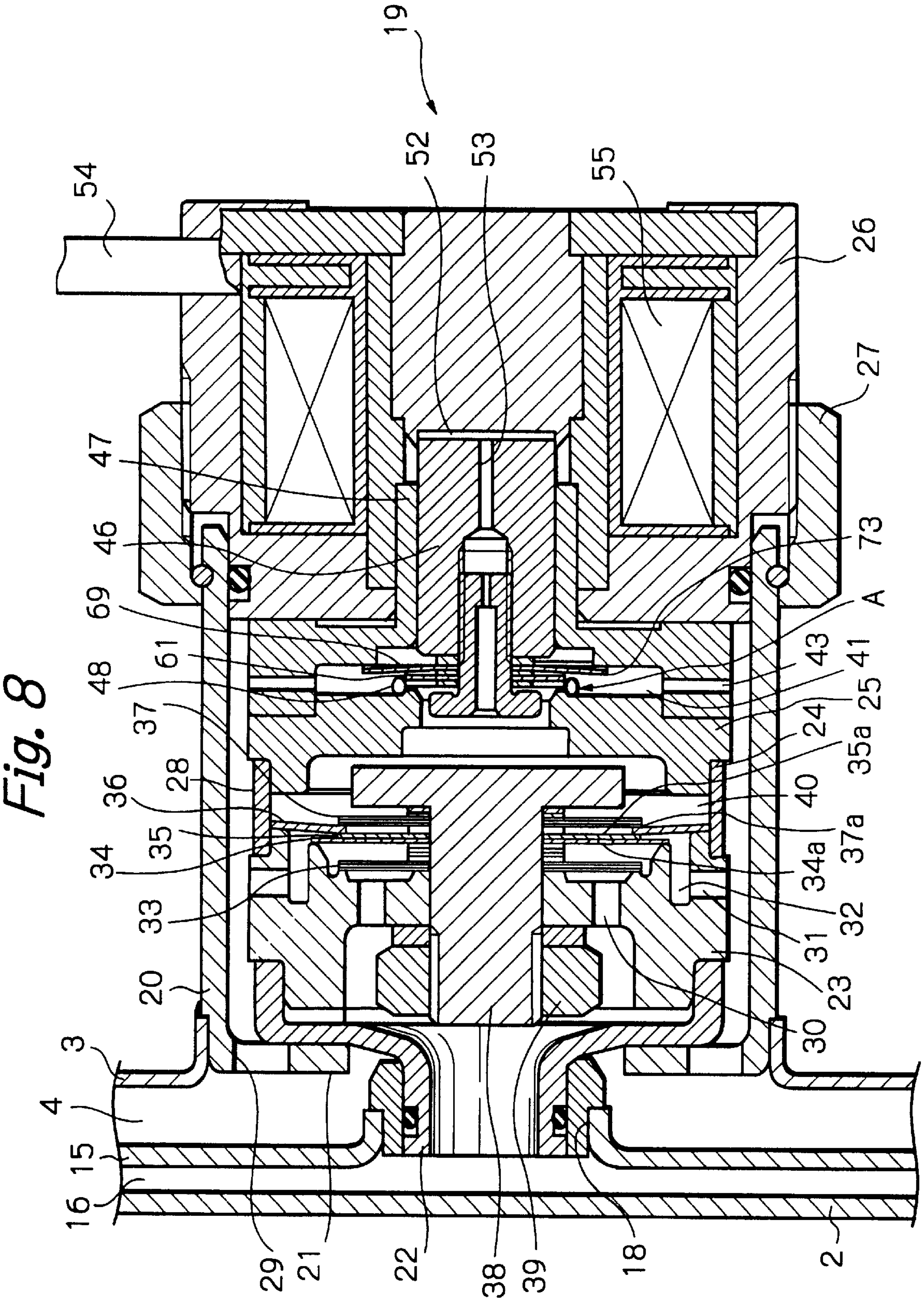
FIG. 8 is a longitudinal view in section showing a damping force generating mechanism of a hydraulic shock absorber of a damping force adjustable type in accordance with a fourth embodiment of the present invention.
Figure 9:
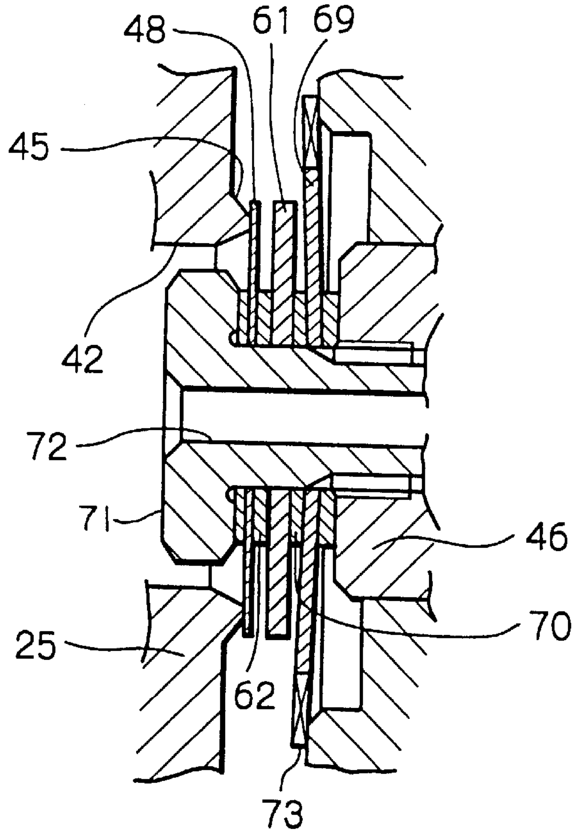
FIG. 9 is an enlarged view showing the pressure control valve of the damping force generating mechanism of the hydraulic shock absorber of FIG. 8.

For the hydraulic shock absorber of a damping force adjustable type in accordance with the fourth embodiment as shown in FIGS. 8 and 9, a disc-shaped plate spring 69 is disposed at the top end portion of the plunger 46, in place of the coil spring 51 disposed on the back surface portion of the plunger 46. The disc-shaped plate spring 69 is disposed on the back surface side of the washer 61 through a spacer 70 and fixed to the plunger 46 with a bolt 71, together with the disc valve 48, the spacers 69 and 70 and the washer 61. The bolt 71 is provided with an oil path 72 communicating with a throttling path 53. With the configuration as described above, the disc valve 48 is depressed upon the valve seat 45 by means of the predetermined set load by the spring force of the disc-shaped plate spring 69. The disc-shaped plate spring 69 is further provided with a cut-away portion 73 on the outer peripheral portion thereof in order to balance the pressure of the oily fluid acting upon both sides thereof.

The configuration as described above does not require a space for locating a coil spring at the back portion of the plunger 46, thereby making the size of a solenoid control valve compact and smaller. Further, as this configuration allows the spring force to act around a mounting portion of the disc valve 48 of the plunger 46, the moment acting upon the plunger 46 can be made smaller by using the spring force of the disc valve 48 and the spring force of the plate spring 69, thereby reducing the sliding resistance by the dropping of the plunger 46 and smoothing the operation thereof.

Figure 14:
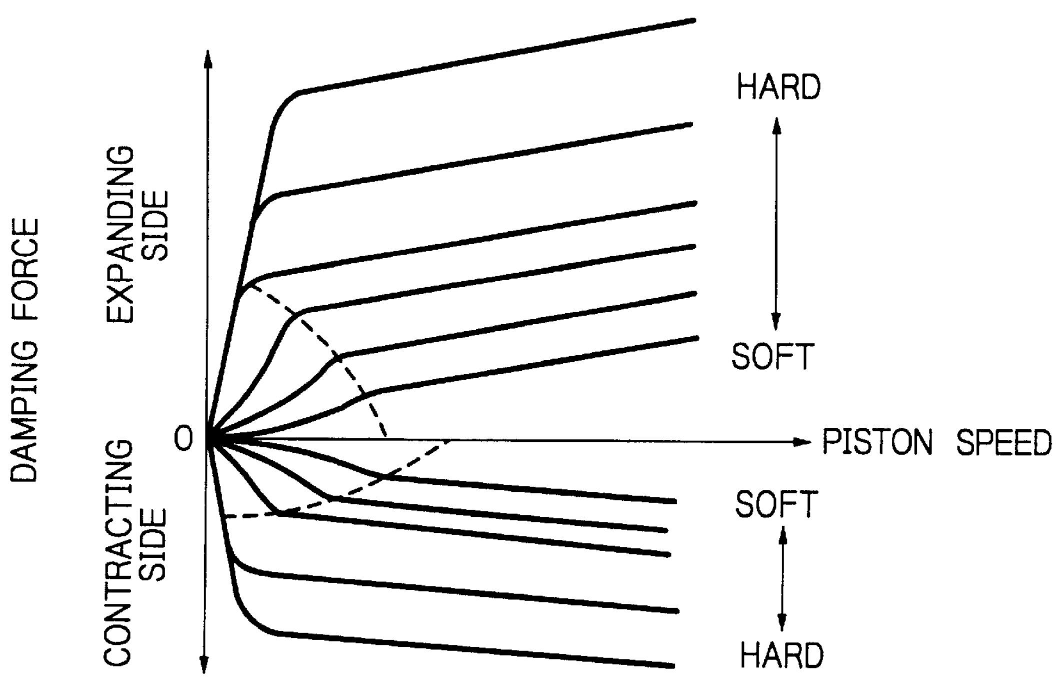
FIG. 14 is a graph showing the damping force characteristics of the hydraulic shock absorber of a damping force adjustable type in accordance with the third embodiment of the present invention.

Furthermore, a description will be made of a hydraulic shock absorber according to a fifth embodiment of the present invention with reference to FIGS. 10 and 14. As the configuration of the hydraulic shock absorber according to the fifth embodiment is substantially similar to that of the fourth embodiment except for the structures of a disc valve of a pressure control valve and a washer, FIGS. 10 and 14 indicate only elements around the pressure control valve. Moreover, in FIGS. 10 and 14, identical elements are provided with the identical reference numerals as those as indicated in FIGS. 8 and 9 and detailed description will be made of the elements different from those as indicated therein.

Figure 10:
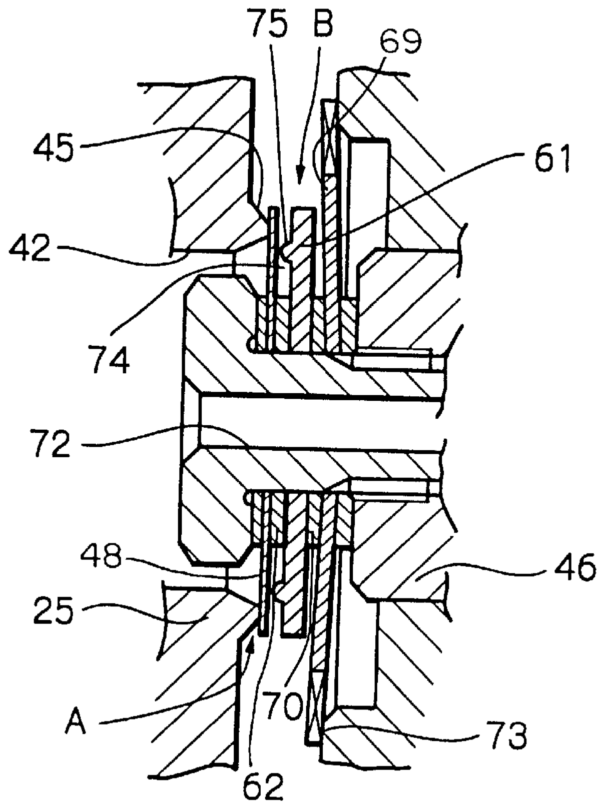
FIG. 10 is an enlarged view showing a damping force generating mechanism of a hydraulic shock absorber of a damping force adjustable type in accordance with a fifth embodiment of the present invention.

For the hydraulic shock absorber of a damping force adjustable type in accordance with the fifth embodiment as shown in FIG. 10, the disc valve 48 is provided with an oil path 74 extending therein axially over its entire length. The washer 61 is provided with a ring-shaped seat section 75 projecting therefrom, and the seat section 75 faces to the disc valve 48 at the outer peripheral portion of the oil path 74 at the back surface portion of the disc valve 48. The seat section 75 is set to be smaller in size than the valve seat 45 on which the disc valve 48 is seated.

Further, usually, the disc valve 48 is pressed upon the valve seat 45 by means of the spring force of the plate spring 69 and caused to bend, thereby being seated on the seat section 75 and blocking the passage of the oil path 74. Upon applying electricity to the coil 55, the plunger 46 is caused to move rearwards in resistance to the spring force of the plate spring 69. As the plunger 46 is moved rearwards, the set load, i.e. the relief pressure, of the disc valve 48 becomes smaller. Further, the back surface side of the disc valve 48 and the seat section 75 constitute a flow rate control valve B, and the seat section 75 is separated more and more from the disc valve 48 as the plunger 46 is being moved rearwards, thereby forming an oil path communicating with the oil path 74 between them and enlarging the passage area thereof.

This configuration of the hydraulic shock absorber according to the fifth embodiment of the present invention can offer the advantages, in addition to the action and effects as achieved by the hydraulic shock absorber according to the fourth embodiment of the present invention, that the passage area of the flow rate control valve B can be adjusted by activating the coil 55, together with the relief pressure of the pressure control valve A, in substantially the same manner as the hydraulic shock absorber according to the third embodiment of the present invention. Therefore, the hydraulic shock absorber according to the fifth embodiment of the present invention can control the orifice characteristics by the flow rate control valve B, together with the valve characteristics by the pressure control valve A, in the low speed region of the piston speed before opening the main disc valve 34, thereby extending the freedom for setting the damping force characteristics. FIG. 14 indicates the damping force characteristics achieved by the hydraulic shock absorber of a damping force adjustable type in accordance with the fifth embodiment of the present invention.

As described above in more detail, the hydraulic shock absorber of a damping force adjustable type in an aspect of the present invention is configured such that the pressure for opening the disc valve can be adjusted by the thrust of a solenoid, thereby directly controlling the damping force before opening the damping valve of a pilot type and, at the same time, changing the pilot pressure by the control pressure of the pressure control valve to control the opening pressure of the damping valve of a pilot type. At this time, a rapid rise of the pressure of the oily fluid can be relieved by the bending of the disc valve. As a consequence, the scope of adjusting the damping force can be extended and an appropriate amount of the damping force can be obtained in the low speed region of the piston speed, too, by the valve characteristics. Moreover, there can be obtained a damping force which is stable even for changes in temperature. This configuration can also absorb a rapid input due to the thrust of a road or for other reasons, thereby controlling a rapid rise in the damping force and improving the riding comfort of the vehicle.

In another aspect of the present invention, the hydraulic shock absorber can prevent the disc valve from being bent to an excessive amount with the regulation member to prevent damage of the disc valve.

In a further aspect of the present invention, the hydraulic shock absorber offers the advantages that the use of a coil spring for biasing the plunger is not required and the solenoid control valve can be made compact and smaller in size, because the opening pressure for opening the disc valve is adjustable by allowing the solenoid to reduce the thrust of the plunger in resistance to the spring force of the plate spring.

In a still further aspect of the present invention, the hydraulic shock absorber presents the features that the orifice characteristics as well as the valve characteristics can be adjusted in accordance with the thrust of the solenoid before opening the damping valve of a pilot type by combing the pressure control valve with the flow rate control valve and that the freedom of adjusting the damping force can be extended.

It is to be understood herein, however, that the present invention has been described in more detail by way of the preferred embodiments in the manner as described above, but the present invention is not construed in any respect as being limited to those preferred embodiments and any modifications and variations are encompassed within the spirit and scope of the present invention as long as they do not depart from the spirit and scope of the invention.

What is claimed is:

1. A hydraulic shock absorber of a damping force adjustable type comprising a cylinder having an oily fluid filled therein, a piston slidably disposed in said cylinder, a piston rod having one end thereof connected to said piston and an other end thereof extending outside of said cylinder, a main oily fluid passage and a subsidiary oily fluid passage that are each connected to said cylinder and conduct oily fluid in response to sliding movement of said piston, a pilot type damping valve disposed in said main oily fluid passage, a fixed orifice in said subsidiary oily fluid passage and a pressure control valve, wherein the pressure between said fixed orifice of said subsidiary oily fluid passage and said pressure control valve acts as a pilot pressure for said pilot type damping valve, and wherein said pressure control valve comprises a solenoid control valve including a disc valve and a plunger movable in accordance with the thrust of a solenoid so that the pressure for opening said disc valve is directly changed in accordance with movement of said plunger.

2. The hydraulic shock absorber of claim 1, wherein a regulation member is disposed on a back surface side of said disc valve, said regulation member abutting said disc valve when said disc valve bends by a predetermined amount and thereby restricting further bending of said disc valve.

3. The hydraulic shock absorber as claimed in claim 1, wherein said plunger provides thrust to said disc valve and is biased by a disc-shaped plate spring.

4. The hydraulic shock absorber as claimed in claim 1, where said pressure control valve has a flow rate control valve for adjusting a passage area of the subsidiary oily fluid passage in accordance with the thrust of said solenoid.

5. A hydraulic shock absorber of a damping force adjustable type so adapted as to adjust a damping force, comprising:

a cylinder having oily fluid filled therein;

a piston slidably disposed in said cylinder so as to form a cylinder chamber therein;

a piston rod having one end thereof extending outside of said cylinder from said piston;

a reservoir disposed in said cylinder for accommodating an operating fluid;

a first fluid path fluidly communicating said cylinder with said reservoir;

a pilot type damping valve in said first fluid path for generating a damping force;

a second fluid path by-passing said pilot type damping valve and arranged to provide a pilot pressure to said pilot type damping valve;

a pressure control valve in said second fluid path, said pressure control valve including a solenoid, a plunger movable in accordance with the thrust of said solenoid and a valve body, and said pressure control valve controlling the pilot pressure of said pilot type damping valve by directly changing the pressure for opening said valve body in accordance with movement of said plunger.

6. The hydraulic shock absorber of claim 5, wherein a regulation member is disposed on a back surface side of said valve body, said regulation member abutting said valve body when said valve body bends by a predetermined amount and thereby restricting further bending of said valve body.

7. The hydraulic shock absorber as claimed in claim 5, wherein said plunger provides thrust to said valve body and is biased by a disc-shaped plate spring.

8. The hydraulic shock absorber as claimed in claim 5, wherein said pressure control valve has a flow rate control valve for adjusting a flow rate of the fluid passing through said second fluid path.

9. The hydraulic shock absorber as claimed in claim 8, wherein said flow rate control valve controls a passage area of said second fluid path in accordance with the thrust of said solenoid.

* * * * *

UNITED STATES PATENT AND TRADEMARK OFFICE

CERTIFICATE OF CORRECTION

PATENT NO. : 6,155,391
DATED : December 5, 2000
INVENTOR(S) : Akira Kashiwagi et al.

It is certified that error appears in the above-identified patent and that said Letters Patent is hereby corrected as shown below:

Title page,
Item [54] the title of the invention should read:
HYDRAULIC SHOCK ABSORBER OF DAMPING FORCE ADJUSTABLE TYPE Signed and Sealed this Second Day of October, 2001

Attest:

Nicholas P. Godici

NICHOLAS P. GODICI

*Attesting Officer* *Acting Director of the United States Patent and Trademark Office*